United States Patent
Feistel

(10) Patent No.: US 6,457,722 B1
(45) Date of Patent: Oct. 1, 2002

(54) SEALING ELEMENT FOR DRY RUNNING SYSTEMS AND THE USE OF A SEALING ELEMENT OF THIS KIND

(75) Inventor: Norbert Feistel, Winterthur (CH)

(73) Assignee: Maschinenfabrik Sulzer-Burckhardt, Basel (CH)

( * ) Notice: Subject to any disclaimer, the term of this patent is extended or adjusted under 35 U.S.C. 154(b) by 0 days.

(21) Appl. No.: 09/424,801

(22) PCT Filed: Jun. 2, 1997

(86) PCT No.: PCT/CH97/00221

§ 371 (c)(1),
(2), (4) Date: Nov. 29, 1999

§ 102(e) Date: Nov. 29, 1999

(87) PCT Pub. No.: WO98/55783

PCT Pub. Date: Dec. 10, 1998

(51) Int. Cl.$^7$ .................................................. F16J 9/12
(52) U.S. Cl. ........................................ 277/493; 277/546
(58) Field of Search ........................... 277/482, 487, 277/488, 493, 496, 543, 546

(56) References Cited

U.S. PATENT DOCUMENTS

| | | | | |
|---|---|---|---|---|
| 965,255 A | * | 7/1910 | Trapp et al. ................. | 277/546 |
| 2,375,869 A | * | 5/1945 | Price, Jr. ..................... | 277/546 |
| 3,588,125 A | | 6/1971 | Mastromatteo | |
| 4,432,925 A | | 2/1984 | Holtzberg | |
| 5,176,389 A | * | 1/1993 | Noone et al. ............ | 277/543 X |
| 5,618,048 A | * | 4/1997 | Moriarty et al. ........ | 277/496 X |

FOREIGN PATENT DOCUMENTS

| | | |
|---|---|---|
| CH | 439 897 | 12/1967 |
| DE | D2108 | 12/1950 |
| DE | 3117603 A1 | 11/1982 |
| EP | 0133786 A2 | 3/1985 |
| WO | WO 87/05076 | 8/1987 |

* cited by examiner

Primary Examiner—Robert J. Sandy
Assistant Examiner—Karlena D Schwing
(74) Attorney, Agent, or Firm—Townsend and Townsend and Crew LLP

(57) ABSTRACT

A sealing element for dry running systems has a segmented sealing ring (2) which comprises at least two ring segments (21) which are arranged adjacently in its peripheral direction, with two adjacent ring segments (21) each contacting one another in the assembled state along an intersection line (22) which subtends an intersection angle ($\alpha$) which is different from 90° to a tangent (23) at the inner jacket surface (24) of the sealing ring (2). The sealing ring (2) has an axial height (H1) which amounts to at most 5.5 mm, in particular to between 2 mm and 4.5 mm.

25 Claims, 3 Drawing Sheets

Figure 1:
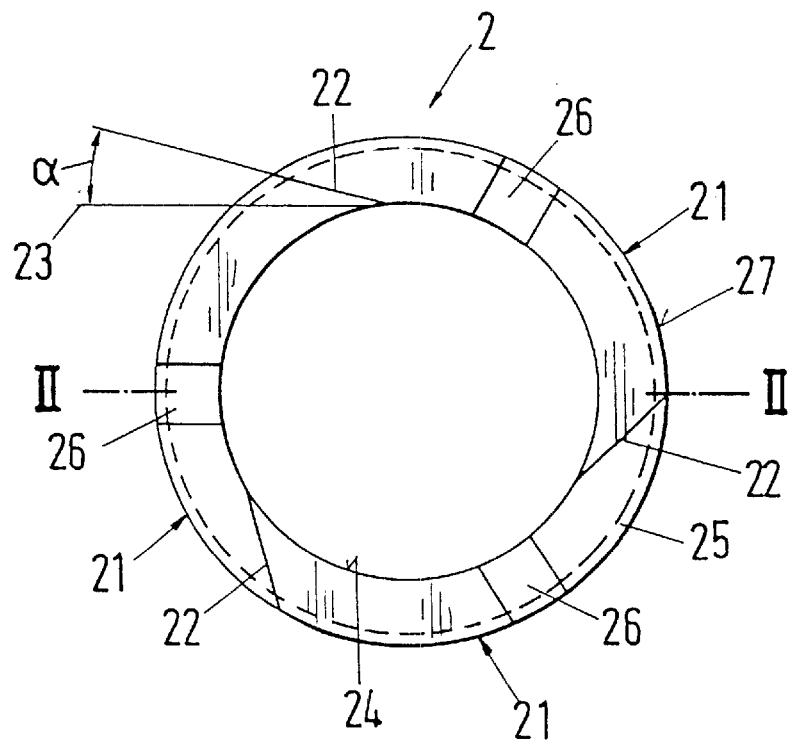

SEALING ELEMENT FOR DRY RUNNING SYSTEMS AND THE USE OF A SEALING ELEMENT OF THIS KIND

The invention relates to a sealing element for dry running systems, in particular for dry running piston compressors, in accordance with the preamble of the independent claim 1 and to its use for dry running piston compressors.

Sealing elements for dry running systems, such as for example dry running piston compressors for the oil-free compression of gases, serve to seal off a pressure difference between a high pressure and a low pressure side of the system, with a foreign lubrication, e.g. by means of oil, being dispensed with. Since sealing of this kind is based on dry friction, sealing elements in dry running systems are usually subject to a natural wear which limits their lifetime—also called the working life.

Sealing elements for dry running systems are nowadays mainly manufactured of plastic, for example of filled polymers. A frequently used polymer material is for example polytetrafluoroethylene (PTFE). Fillers such as amorphous carbon, graphite, glass fibres, metals, ceramics or solid lubricants are introduced into the PTFE matrix.

In a dry running piston compressor, sealing elements are used for the sealing of the piston rod and/or as piston rings for sealing the piston. The counter-running partner of the sealing element, which means the surface which is moved relative to the sealing element, is the piston rod in the first case and the inner wall of the cylinder, the so-called cylinder running surface, in the second case.

The performance of a sealing element in a dry running system is frequently characterised by the so-called pv value. This value is the product of the contact pressure (p) with which the sealing element is pressed against the counter-running partner and the frictional velocity (v) at which the sealing element moves with respect to its counter-running partner. For a dry running piston compressor, to which reference is made in the following as a representative example of a dry running system, the pv value is to be understood as the product of the average pressure difference (p) to be sealed off and the average piston velocity (v).

In practice it is desirable for the operation of dry running piston compressors to have a high performance sealing element which can withstand pv values which are as high as possible for as long as possible. In this, the leakage rates along the sealing element should be very low. Furthermore, the sealing elements should have the longest possible working life, which means that their sealing properties should remain substantially of unaltered high quality over the longest possible working life.

It is usual, to increase the working life in particular, to arrange a plurality of sealing elements one after the other in the axial direction, both for the sealing of the piston rod and for the sealing of the piston, and form a sealing element set. For the sealing of the piston rod, a component which contains a sealing element set of this kind is called a packing.

It is also known to provide special sectional shapes of the sealing element to increase the working life. In CH 439 897 a packing for the sealing of a piston rod is for example disclosed having a plurality of sealing rings each of which is segmented, with the section lines between the individual segments of a sealing ring extending approximately tangentially to the inner jacket surface of the sealing ring. A hose spring encircling the sealing ring provides a prestress and presses the individual segments against the piston rod. The wear caused by abrasion of material is compensated in that the individual segments are pushed inwards by the pressure exerted on them in the direction of the piston rod.

However, for the maximum pv value which a packing of this kind can withstand in continuous operation, it is not the number of sealing elements in a packing which is primarily decisive but the performance of an individual sealing element. It is known, namely, that the distribution of the pressure difference to be sealed off is usually not uniform over the different sealing elements of the sealing element set. In practice the realistic extreme case can even be such that the entire pressure difference is substantially sealed off by only one of the sealing elements.

Sealing rings for dry running piston compressors are usually manufactured nowadays with an axial ring height of at least 7 mm. This minimum height is based, on the one hand, on the consideration that the friction surface of the sealing ring becomes too small at smaller ring heights and thus that its sealing action becomes too poor so that at typical pressure differences of, for example, 40 bar, the leakage rate would take on unjustifiably large values. On the other hand this minimum thickness is motivated by the fact that the sealing ring must also be sufficiently stable mechanically in order to withstand the stresses without a significant deformation, that is, one which considerably influences the sealing action. In particular PTFE, which is frequently used as sealing ring material, is known to have a pronounced tendency to creep (high cold flow) so that an additional support ring is necessary to avoid deformation of the sealing ring at pressure differences of for example 40 bar.

Most of the sealing rings which are segmented for compensation of the wear admittedly have a segment profile which is gas-tight in the radial direction; the usual direction of cutting however produces gaps and joints which are open in the axial direction and must be sealed off by an additional cover ring. This cover ring is frequently of three piece radially cut design and arranged together with the actual sealing ring to form a sealing ring pair in such a manner that through-going gaps are no longer present. A fixing pin between the two rings is intended to prevent the alignment of the ring gaps to form through-going gaps during operation. The cover ring usually has the same axial height as the sealing ring. Such known sealing ring pairs typically achieve a total axial height of 18 mm and more. These axial heights limit the number of sealing ring pairs which can be arranged in a packing with a predetermined constructional length.

One of the main problems which limit the maximum pv value which a sealing ring can withstand over longer periods of time is the frictional heat arising in dry running sealing elements. With increasing pv values, such high temperatures rapidly arise in the frictional surfaces that the sealing elements, which frequently consist of plastic nowadays, are thermally destroyed. Practice has shown that currently known sealing elements for dry running systems are immediately destroyed or have unusably short working lives at pv values of more than about 140 bar·m/s. For an average piston velocity in a dry running piston compressor of 3.5 m/s, there thus results a pressure difference maximum of 40 bar which can be sealed off by a sealing element.

With this state of the art as a starting point it is an object of the invention to provide a sealing element with a better performance for dry running systems, in particular for dry running piston compressors. The sealing element should be able to withstand pv values significantly greater than 140 bar-m/s and also have a long working life during which the sealing action substantially remains of the same quality. In addition the sealing element should also enable high pressure differences to be sealed off in a dry running system with very low leakage rates and have only a minimum wear.

The sealing element for dry running systems, in particular for dry running piston compressors, satisfying this object is characterised by the features of the independent patent claim 1. The sealing element in accordance with the invention has a segmented sealing ring which comprises at least two ring segments which are adjacently arranged in its peripheral direction, with in each case two adjacent ring segments contacting one another in the assembled state along a cutting line which forms an angle of intersection with a tangent at the inner jacket surface of the sealing ring which is different from 90°. The sealing ring has an axial height which amounts to at most 5.5 mm, and in particular to between 2 mm and 4.5 mm.

A completely surprising finding is that the performance of the sealing element can be quite considerably increased by a reduction of the axial height of the sealing ring in combination with the path taken by the cut between the ring segments. Thus it has been shown in practice that the sealing element in accordance with the invention withstands pv values of over 800 bar·m/s without problem and over. longer periods of time. In comparison with conventional sealing elements this means that for example at least five times as great a pressure difference can be sealed off at the same average piston velocity by the sealing element in accordance with the invention, without the leakage rate thereby achievable increasing significantly. It has also been shown that the wear in the sealing element in accordance with the invention in the operating state is considerably lower than that in known sealing elements, which results in a significantly longer working life during which the sealing action remains of substantially the same quality.

For technical manufacturing reasons the sealing ring preferably consists of three ring segments.

It has furthermore been shown in experiments in which the pv value is held constant that a particularly favourable compromise between the leakage rate and the temperature in the frictional surface of the seal results when the axial height of the sealing ring amounts to about 4 mm.

The intersection angle which the cut line between two adjacent ring segments forms with the tangent at the inner jacket surface of the sealing ring preferably amounts to at most 45°, in particular at most 20°, because, on the one hand, a very good sealing action can be achieved thereby in the axial and the radial directions and because, on the other hand, the ring segments are displaced under the pressure load in a wear-compensating manner.

Through the special path taken by the cut in the sealing ring, there are already no through-going gaps or joints in the new state, either in the radial or in the axial direction. With this path of the cutting, the wear compensation results from mutual displacement of the ring elements along the cutting lines or surfaces of mutual contact. Through this parallel displacement, at most negligibly small gaps arise between the ring segments even in the state of advanced wear. The advantage results therefrom that no additional cover rings are necessary in the sealing element in accordance with the invention.

In a particularly preferred embodiment the sealing element in accordance with the invention further comprises a base ring for the reduction of the leakage rate, which is preferably executed in a single piece, in particular without a gap, or endlessly. This base ring is preferably arranged in the operating state at the low pressure side adjacent to the sealing ring in the axial direction and dimensioned in such a manner that it extends without contact with respect to the counter-running partner yet with as little clearance as possible. The leakage rates can be considerably further reduced by this base ring.

The base ring can however also be executed in a plurality of parts, that is comprise a plurality of segments arranged adjacently in its peripheral direction. This is for example advantageous if the base ring is to be installed without removing the piston rod or when the base ring must be laid around the piston as a part of a piston seal. If the base ring is executed as a plurality of parts, then the individual segments are held together for example by means of a surrounding hose spring. Furthermore, the path of the cut between the individual segments of the base ring is such that, on the one hand, no compensation for wear is possible and, on the other hand, the base ring is gas tight in the radial direction. This can preferably be realised in that the cut lines between the segments extend in the radial direction, with no gap clearance being provided between the segments.

The base ring preferably has an axial height of at most 6 mm, in particular of about 4 mm, in order that the sealing element is as compact as possible in the axial direction and takes up as little space as possible.

In a preferred embodiment the sealing ring and/or the base ring are manufactured substantially of a high-temperature polymer such as poly(ether ether ketone) (PEEK), polyimide (PI), polyamidimide (PAI), poly (phenylene sulphide) (PPS), or an epoxy resin (EP) because high-temperature polymers of this kind withstand high difference pressures substantially without deformation as a result of their mechanical properties and have a high hot strength in addition. Since the base ring operates substantially without contact with respect to its counter-running partner in the operating state, it can also be manufactured of other materials which have a good hot strength and have at least emergency running properties for the non lubricated operation, for example of bronze, sintered iron or graphite.

Alternatively, however, it is also possible to manufacture the sealing ring and/or the base ring of a technical ceramic such as aluminium oxide, zirconium oxide, silicon carbide, silicon nitride. This is in particular advantageous because the working life can be considerably increased through the high abrasion resistance of such ceramics.

As a result of its high performance and its low wear the sealing element in accordance with the invention is particularly suitable for a packing for the sealing of a dry running piston rod and for a piston seal for a dry running piston compressor.

The sealing element in accordance with the invention can be used in particular for the sealing of the piston rod and/or the piston in a dry running piston compressor which can be operated at pv values of more than 140 bar·m/s. Long working lives can be achieved even at such high pv values. This is particularly advantageous because previously known sealing elements are not suitable for such a high performance operation.

Further advantageous measures and preferred embodiments of the invention result from the dependent claims.

Figure 2:
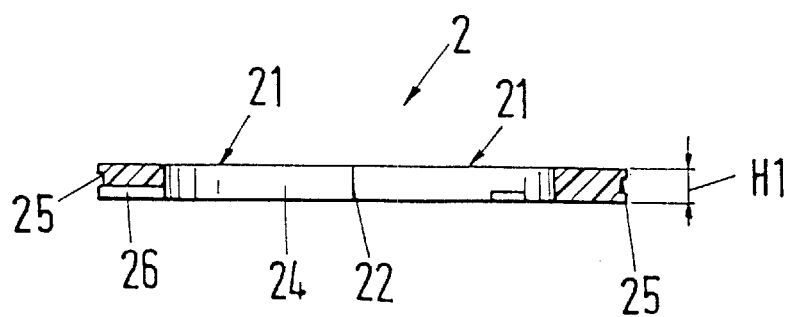
Figure 3:
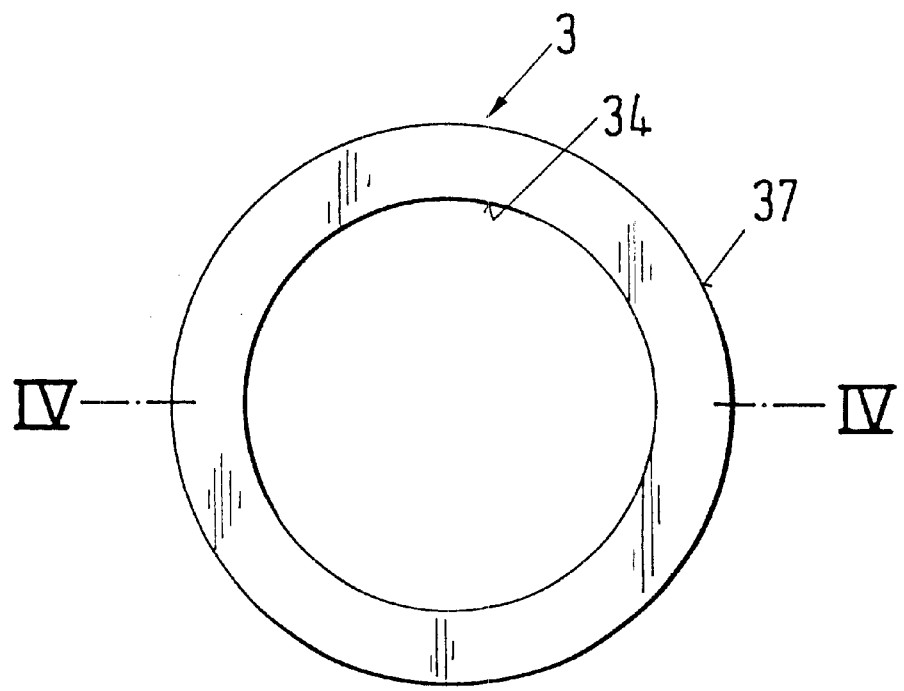
Figure 4:
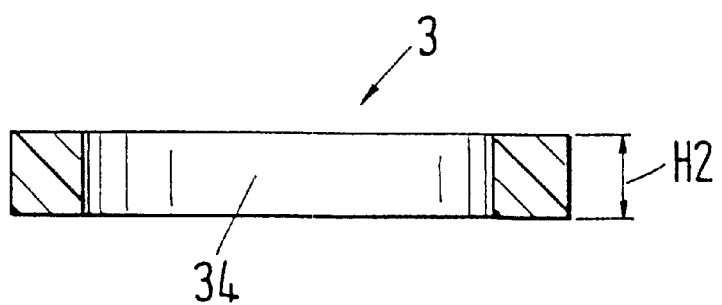
Figure 5:
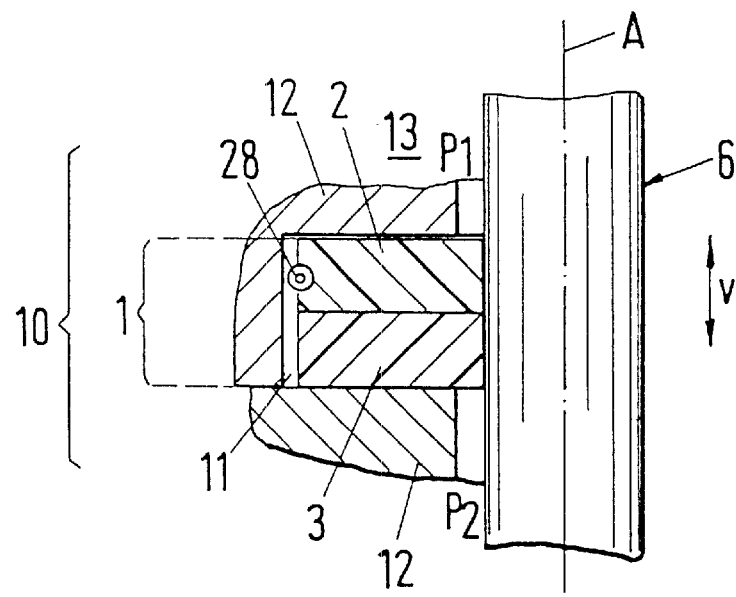
Figure 6:
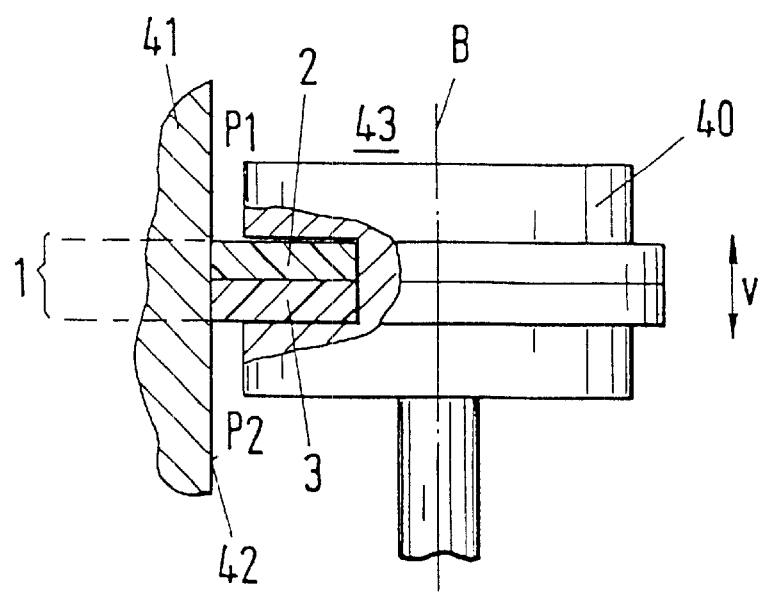

The invention will be explained in more detail in the following with reference to the exemplary embodiments and with reference to the drawings. Shown in the schematic drawings, which are not to scale, are:

FIG. 1 a plan view of an exemplary embodiment of a sealing ring of the sealing element in accordance with the invention, FIG. 2 a sectional illustration of the sealing ring of FIG. 1 along the section line II—II in FIG. 1, FIG. 3 a plan view of an exemplary embodiment of a base ring, FIG. 4 a sectional illustration of the base ring of FIG. 3 along the section line IV—IV in FIG. 3, FIG. 5 a schematic sectional illustration of a section of a packing for the piston rod seal with a sealing element in accordance with the invention, and FIG. 6 a schematic illustration of a piston seal with a sealing element in accordance with the invention in the installed state (partially in section).

FIG. 5 shows, in a schematic sectional illustration, a section of a packing 10 for sealing the piston rod in a dry running piston compressor. The packing 10 has a particularly preferred exemplary embodiment of the sealing element in accordance with the invention which is designated in its entirety by the reference numeral 1. In this exemplary embodiment the sealing element 1 comprises a segmented sealing ring 2 and a base ring 3 which are arranged adjacently in the axial direction. FIG. 1 shows a plan view of an exemplary embodiment of the segmented sealing ring 2 in the assembled state. The plan view is made in the axial direction. In FIG. 2 this sealing ring 2 is illustrated in a section along the line II—II of FIG. 1.

FIG. 3 shows an exemplary embodiment of a base ring 3 of the sealing element 1, likewise in plan view in the axial direction. This base ring 3 is illustrated in FIG. 4 in a section along the line IV—IV of FIG. 3.

In accordance with the invention the segmented sealing ring 2 comprises at least two ring segments 21 arranged adjacently in its peripheral direction. Three ring segments 21 are provided in the exemplary embodiment illustrated in FIG. 1 and FIG. 2. In the assembled state of the sealing ring 2, each pair of adjacent ring segments 21 contact each other along a cut or interface line 22. The ring segments 21 are executed in such a manner that in each case the cut line 22 between adjacent ring segments 21 subtends an angle of intersection $\alpha$ which is different from 90° to a tangent 23 at the inner jacket surface 24 of the sealing ring 2.

In accordance with the invention the sealing ring 2 has an axial height H1 which amounts to at most 5.5 mm and in particular to between 2 mm and 4.5 mm. The axial height H1 is to be understood as meaning the maximal extension which the sealing ring 2 has along its periphery in the axial direction, that is, in the direction of its cylinder axis.

If the sealing ring 2 is to be used for the sealing of a piston rod 6 (see FIG. 5) it is advantageous to provide a groove 25 in its outer jacket surface 27 (FIG. 1, FIG. 2) which extends in the ring segments 21 along the entire periphery of the sealing ring 2. The groove 25 is indicated in FIG. 1 by the dashed circular line. A hose spring 28 (FIG. 5) is laid into the groove 25 and surrounds the sealing ring 2 over its entire periphery. The hose spring 28 produces a bias force on the ring segment 21 which acts in the direction towards the piston rod 6 and ensures a sufficiently great sealing action of the sealing ring 2, in particular during the start-up phase of the piston rod 6.

The sealing ring 2 can also optionally have back-flow grooves 26, through which e.g. the excess pressure in the packing can be let off into the compression chamber during the suction stroke. The back-flow grooves 26 each extend in the radial direction from the inner jacket surface 24 to the outer jacket surface 27 and have a depth in the axial direction which amounts for example to about a fourth of the axial height H1 of the sealing ring 2.

The base ring 3 (FIG. 3, FIG. 4) is executed as a single-piece, endless, that is, uncut, ring in contrast to the segmented sealing ring 2 in accordance with FIG. 1 and FIG. 2. The base ring 3 has for example a rectangular cross-sectional surface, as shown in FIG. 4. The base ring 3 has an axial height of at most 6 mm and in particular of about 4 mm. The base ring 3 is dimensioned in such a manner that in the assembled state it extends to its counter-running partner with as little clearance as possible, but without contact.

FIG. 5 shows the exemplary embodiment of the sealing element in accordance with the invention as a part of the packing 10 for the sealing off of the piston rod 6 of a dry running piston compressor. In the operating state the piston rod 6 moves back and forth with an average velocity v in the direction of its longitudinal axis A as is symbolically indicated by the double arrow provided with the reference symbol v. In this situation the packing 10 serves to seal off the pressure difference $p=p_1-p_2$ between the high pressure side (compression chamber 13) where a high pressure $p_1$ is present and the low pressure side where a lower pressure $p_2$ is present. The packing 10 comprises, in a manner which is known per se, at least one sealing chamber 11, which is formed by two chamber rings 12 which are mounted in a manner which is sealing to the associated compression chamber 13, for example screwed on. In the sealing chamber 11 the sealing element 1 is provided with the sealing ring 2 and the base ring 3, with the base ring 3 being arranged at the low pressure side of the sealing ring 2. It is obvious that the packing 10 can naturally also contain a plurality of sealing elements 1 which are arranged in the form of a series connection, that is, one after the other in the axial direction. In this case a plurality of chamber rings 12 are also provided so that each sealing element 1 has available its own sealing chamber 11. Obviously the packing 10 can also contain throttle or restrictor rings for dissipating dynamic pressure peaks.

The hose spring 28 produces a bias force which presses the ring segments 21 against one another and against the piston rod 6. In this manner a sufficient sealing action is ensured between the inner jacket surface 24 of the sealing ring 2 and its counter-running partner—the piston rod 6—in particular also during the start-up phase of the compressor or in such operating states in which no or only a slight difference pressure $p_1-p_2$ is present.

The single-piece, endless base ring 3 is dimensioned in such a manner that its inner jacket surface 34 (FIG. 3, FIG. 4) just fails to contact the piston rod 6. It thus surrounds the piston rod 6 without contact but with as little clearance as possible so that it operates in accordance with the principle of a gap ring seal.

In a similar embodiment the sealing element 1 is also suitable for the sealing off of a piston 40 (FIG. 6) of a dry running piston compressor. FIG. 6 shows a piston seal for the piston 40 of a compressor of this kind in a schematic, partially sectioned illustration, which contains a sealing element 1 in accordance with the invention. In the operating state the piston 40 moves back and forth in the direction of its longitudinal axis B with an average piston velocity v, as is indicated symbolically by the arrow with the reference symbol v, in a cylinder 41, the walls of which form a cylinder running surface 42. During this, the piston 40 produces a pressure difference $p=p_1-p_2$ between the high pressure side (compression chamber 43), where the pressure $p_1$ is present, and the low pressure side, where the pressure $p_2$ is present. The sealing element 1 is provided as a piston ring for the sealing off of this pressure difference p. In principle the sealing element 1 is executed in a manner analogous to that previously explained, that is, analogous to the sealing ring 2 and the base ring 3. In the use as a piston seal, however, the outer jacket surfaces 27 (FIG. 1) and 37 (FIG. 3) respectively of the sealing ring 2 or the base ring 3 respectively serve for the sealing off of the pressure difference p. Naturally, in its use as a piston seal, the sealing ring 2 has no groove 25 and no hose spring 28. It can however be advantageous to place a non-illustrated tension spring at the inner jacket surface 24 of the sealing ring 2 in order to produce a bias force in a manner analogous to that explained previously which presses the ring segments against one another and against the counter-running partner—the cylinder running surface 42.

The base ring 3 is dimensioned in such a manner that it extends with as little clearance as possible with respect to the cylinder running surface 42 but without contact. If the piston 40 is executed in assembled form, that is, comprises a plurality of ring chambers which are fitted together in alternation with the piston rings during the assembly to form the piston 40, then the base ring 3 (FIG. 3, FIG. 4) is preferably executed as a single piece, that is, endless, in this case as well. For the classical grooved piston, however, a multi-piece base ring, that is, one comprising a plurality of segments, must be used. For reasons already mentioned previously, these segments are preferably executed in such a manner that the cut lines between the segments extend in the radial direction, with no gap clearance being provided between the segments.

It is clear that in the piston seal as well, a plurality of sealing elements 1 which are arranged one behind the other can be provided as piston rings as well as guide rings if required.

Since it makes no difference for the principles of operation whether the sealing element 1 in accordance with the invention is employed with the sealing ring 2 for the sealing off of the piston rod 6 or for the sealing of the piston 40, the following explanations hold in an analogous manner for both cases.

Through the special execution of the ring segments 21 (FIG. 1), which in the assembled state leads to the cut line 22 between two adjacent ring segments 21 forming an intersection angle α which differs from 90° with the tangent 23 at the inner jacket surface, the sealing ring 2 has no through-going gap in the radial direction. During the operation of the compressor the individual ring segments 21 are pressed together by the difference pressure p along the cut lines 22 so that the sealing ring 2 enables a sealing off both in the radial direction and in the axial direction. In order to achieve as good a seal between the individual ring segments 21 as possible, it is advantageous to make the intersection angle α less than 45°, and in particular less than 20°. A particularly good seal can be achieved with the intersection angle α=0° (tangential cut). However, since this involves the danger that the thin tips of the ring segments 21 can be damaged, an intersection angle α of about 15° is particularly advantageous for many applications.

Furthermore, a wear compensation during operation results from the path of the cut lines 22 between the ring segments 21. The material wear at the frictional surfaces 24 or 27 respectively which is caused by abrasion is compensated by a self adjustment of the ring segments 21 because the latter can be displaced relative to one another under the pressure difference p exerted on them so that the contact pressure onto the counter-running partner (the piston rod 6 or the cylinder running surface 42) remains present. Through this wear compensation the working life of the sealing element 1 can be significantly increased while maintaining a lastingly lower leakage rate.

The sealing element 1 or the sealing ring 2 respectively and the base ring 3 are preferably manufactured substantially of a high-temperature polymer such as poly(ether ether ketone) (PEEK), polyimide (PI), polyamidimide (PAI), poly (phenylene sulphide) (PPS), or an epoxy resin (EP). "Substantially" in this case means that the high-temperature polymer is used in a modification suitable for dry running, which means that solid lubricants such as carbon, graphite, molybdenum sulphide ($MoS_2$), PTFE, etc. are admixed to it. High-temperature polymers have a high mechanical strength even at the temperatures which are usual in dry running (high warm strength). In addition they have practically no cold flow so that they are also of stable shape at high pressures without additional measures such as e.g. a support ring being necessary. Furthermore, high-temperature polymers have a considerably higher module of elasticity than for example PTFE so that they enable a high stiffness and a high mechanical loadability of the sealing element 1.

The sealing ring 2 and the base ring 3 can be e.g. machined out of a plate or bar shaped semi-finished product in a known manner by means of a chip-forming machining technique. Alternatively, they can also be manufactured by means of injection moulding methods. In injection moulding in particular, it is also possible to manufacture the individual ring segments 21 separately from one another by a corresponding execution of the mould.

Another, likewise preferred possibility consists in manufacturing the sealing ring 2 and/or the base ring 3 of a technical ceramic such as e.g. aluminium oxide, zirconium oxide, silicon carbide, silicon nitride, etc. Technical ceramic materials of this kind have an enormously high abrasion resistance, through which the working life of the sealing element can further be significantly increased.

The sealing ring 2 and the base ring 3 can but need not be manufactured of the same material.

An essential feature of the sealing element 1 in accordance with the invention is that the axial height H1 of the sealing ring 2 amounts to at most 5.5 mm and, in particular, to between 2 mm and 4.5 mm. It is a surprising find here that a quite considerable increase in the performance of the sealing element can be achieved by the reduced axial height H1 in comparison with the known sealing elements in combination with the non-radial path of the cut between the ring segments 21. The sealing element in accordance with the invention can lastingly withstand pv values which are at least five times as high as those which can be achieved with known sealing elements. With the average piston velocity being held constant, this means that end pressures of over 200 bar can be achieved in a dry running piston compressor. Furthermore, it is particularly advantageous that in spite of the considerable increase in performance the wear on the sealing element 1 in accordance with the invention is extremely low in the operating state so that very long working lives, for example several thousand operating hours, can be achieved.

It has been shown that there is a particularly advantageous compromise between a low leakage rate and low temperature in the frictional surface at high pv values of for example more than 140 bar·m/s if the axial height of the sealing ring 2 amounts to about 4 mm.

In regard to as low a leakage rate as possible it is particularly advantageous if in addition to the sealing ring 2 the sealing element 1, as described above, contains the base ring 3, which is arranged without contact with respect to the counter-running partner. Through the combination of the sealing ring 2 and the base ring 3 the leakage rate of the sealing element 1 can be yet further reduced so that even during the compression of very light gases such as e.g. hydrogen in dry running systems and even for high end pressures, sealing actions can be achieved which are superior to those of conventional sealing elements.

The axial height of the base ring 3, which operates without contact, can in principle be made to any size desired.

For reasons of saving space it is however advantageous if the axial height H2 amounts to at most 6 mm and in particular to about 4 mm. In this manner the total axial height H1+H2 of the combination of the base ring 3 and the sealing ring 2 in the particularly preferred embodiment amounts merely to about 8 mm. Thanks to this narrow total height, more sealing elements can be accommodated in a predetermined constructional space in comparison with standard piston rod seals or piston seals, through which the total working life of the sealing element set increases over-proportionally.

The sealing element in accordance with the invention is distinguished in that it lastingly withstands very high pv values in dry running systems and has only a very low wear and low leakage rate.

What is claimed is:

1. Sealing element for dry running systems, comprising a segmented sealing ring which has at least two ring segments arranged adjacently in a circumferential direction, adjacent ring segments contacting one another when in an assembled state along an interface line which subtends an intersection angle which is different from 90° to a tangent at an inner jacket surface of the sealing ring, the sealing ring having an axial height which amounts to at most 5.5 mm.

2. Sealing element in accordance with claim 1, wherein the sealing ring comprises three ring segments.

3. Sealing element in accordance with claim 1, wherein the axial height of the sealing ring is about 4 mm.

4. Sealing element in accordance with claim 1, wherein the intersection angle is no more than 45°.

5. Sealing element in accordance with claim 1, comprising a base ring for reducing a leakage rate.

6. Sealing element in accordance with claim 5, wherein the base ring is made of a single piece.

7. Sealing element according to claim 6, wherein the base ring comprises an endless ring without gaps.

8. Sealing element in accordance with claim 5, wherein the base ring has an axial height of no more than 6 mm.

9. Sealing element in accordance with claim 5, wherein at least one of the sealing ring and the base ring is manufactured substantially of a high-temperature polymer.

10. Sealing element in accordance with claim 9, wherein the high temperature polymer is selected from the group consisting of poly(ether ether ketone), polyimide, polyamidimide, poly(phenylene sulphide) and epoxy resin.

11. Sealing element in accordance with claim 5, wherein at least one of the sealing ring and the base ring is manufactured of a technical ceramic.

12. Sealing element in accordance with claim 11, wherein the technical ceramic is selected from the group consisting of aluminum oxide, zirconium oxide, silicon carbide and silicon nitride.

13. Sealing element in accordance with claim 1, wherein the axial height of the sealing ring is between 2 mm and 4.5 mm.

14. Sealing element in accordance with claim 1, wherein the intersection angle is no more than 20°.

15. Packing for the sealing of a dry running piston rod comprising a sealing element having a segmented sealing ring which has at least two ring segments arranged adjacently in a circumferential direction, adjacent ring segments contacting one another when in an assembled state along an interface line which subtends an intersection angle to a tangent at an inner jacket surface of the sealing ring which is different from 90°, the sealing ring having an axial height which amounts to at most 5.5 mm.

16. Piston ring for a dry running piston compressor comprising a sealing element having a segmented sealing ring which has at least two ring segments arranged adjacently in a circumferential direction, adjacent ring segments contacting one another when in an assembled state along an interface line which subtends an intersection angle to a tangent at an inner jacket surface of the sealing ring which is different from 90°, the sealing ring having an axial height which amounts to at most 5.5 mm.

17. Piston compressor with a sealing element having a segmented sealing ring which has at least two ring segments arranged adjacently in a circumferential direction, adjacent ring segments contacting one another when in an assembled state along an interface line which subtends an intersection angle to a tangent at an inner jacket surface of the sealing ring which is different from 90°, the sealing ring having an axial height which amounts to at most 5.5 mm.

18. Sealing element for a piston of a dry running system comprising a seal ring adapted to be operated at pv values of more than 140 bar·m/s having at least first and second ring segments, the segments ending in interfaces which overlap when the ring segments are in an assembled state, the seal ring having an axial height of no more than 5.5 mm.

19. Sealing element according to claim 18, wherein the axial height of the sealing ring is no more than about 4 mm.

20. Sealing element in accordance with claim 18, wherein the interfaces define an intersection line which is at an angle other than 90° relative to a tangent at an inner jacket surface of the sealing ring.

21. A dry running piston compressor in accordance with claim 18, wherein the seal ring is made of a high temperature polymer.

22. A piston compressor comprising a dry running piston including a circumferential groove and a non-metallic sealing ring disposed in the groove and capable of operating at pv values of more than 140 bar·m/s, the sealing ring having first and second seal ring segments, ends of which define overlapping seal ring segment interfaces in contact with each other, the sealing ring having an axial height which is no more than 5.5 mm.

23. A dry running piston compressor according to claim 22, wherein the axial height of the sealing ring is no more than about 4 mm.

24. A dry running piston compressor in accordance with claim 22, wherein the interfaces define an intersection line which lies at an angle other than 90° relative to a tangent at an inner jacket surface of the sealing ring.

25. A dry running piston compressor in accordance with claim 22, wherein the seal ring is made of a high temperature polymer.

* * * * *